United States Patent
Shen et al.

(10) Patent No.: US 12,236,241 B2
(45) Date of Patent: Feb. 25, 2025

(54) DATA PROCESSING APPARATUS WITH SELECTIVELY DELAYED TRANSMISSION OF OPERANDS

(71) Applicant: Arm Limited, Cambridge (GB)

(72) Inventors: Xiaoyang Shen, Valbonne (FR); Zichao Xie, Cambourne (GB); Cédric Denis Robert Airaud, Saint Laurent du Var (FR); Grégorie Martin, Valbonne (FR)

(73) Assignee: Arm Limited, Cambridge (GB)

( * ) Notice: Subject to any disclaimer, the term of this patent is extended or adjusted under 35 U.S.C. 154(b) by 78 days.

(21) Appl. No.: 18/174,207

(22) Filed: Feb. 24, 2023

(65) Prior Publication Data

US 2024/0289130 A1 Aug. 29, 2024

(51) Int. Cl.
*G06F 9/30* (2018.01)
*G06F 9/38* (2018.01)
*G06F 15/80* (2006.01)

(52) U.S. Cl.
CPC ........ *G06F 9/30098* (2013.01); *G06F 9/3824* (2013.01); *G06F 9/3826* (2013.01); *G06F 9/3869* (2013.01); *G06F 15/8023* (2013.01)

(58) Field of Classification Search
CPC .... G06F 9/3824; G06F 9/3826; G06F 9/3828; G06F 15/8023; G06F 15/82; G06F 15/825; G06F 15/8046; G06F 1/3206
See application file for complete search history.

(56) References Cited

U.S. PATENT DOCUMENTS

| | | | | |
|---|---|---|---|---|
| 10,915,297 | B1 * | 2/2021 | Halutz | G06F 17/153 |
| 11,500,802 | B1 * | 11/2022 | Xu | G06F 15/17318 |
| 2001/0034826 | A1 * | 10/2001 | Roussel | G06F 9/3885 |
| | | | | 712/225 |
| 2003/0084353 | A1 * | 5/2003 | Chang | G06F 1/3243 |
| | | | | 713/300 |
| 2003/0126403 | A1 * | 7/2003 | Mirsky | G06F 15/8023 |
| | | | | 712/11 |
| 2009/0300329 | A1 * | 12/2009 | Naffziger | G06F 1/3203 |
| | | | | 712/205 |
| 2013/0262831 | A1 * | 10/2013 | Nelson | G06F 9/3887 |
| | | | | 712/215 |
| 2013/0268747 | A1 * | 10/2013 | Chang | G06F 9/4405 |
| | | | | 713/2 |

(Continued)

*Primary Examiner* — Keith E Vicary
(74) *Attorney, Agent, or Firm* — NIXON & VANDERHYE P.C.

(57) ABSTRACT

A data processing apparatus comprises operand routing circuitry configured to prepare operands for processing, and a plurality of processing elements. Each processing element comprises receiving circuitry, processing circuitry, and transmitting circuitry. A group of coupled processing elements comprises a first processing element configured to receive operands from the operand routing circuitry and one or more further processing elements for which the receiving circuitry is coupled to the transmitting circuitry of another processing element in the group. The apparatus also comprises timing circuitry, configured to selectively delay transmission of operands within the group of coupled processing elements to cause operations performed by the group of coupled processing elements to be staggered.

18 Claims, 13 Drawing Sheets

(56) References Cited

U.S. PATENT DOCUMENTS

| | | | |
|---|---|---|---|
| 2014/0157277 A1* | 6/2014 | Eisen | G06F 1/26 718/102 |
| 2014/0365750 A1* | 12/2014 | Shirvani | G06F 9/3871 712/223 |
| 2015/0089198 A1* | 3/2015 | Sommers | G06F 9/3836 712/214 |
| 2015/0091915 A1* | 4/2015 | Hurd | G06F 9/38 345/506 |
| 2015/0261270 A1* | 9/2015 | Vikinski | G06F 1/28 713/300 |
| 2015/0378412 A1* | 12/2015 | Suryanarayanan | G06F 9/3836 713/340 |
| 2016/0048187 A1* | 2/2016 | Zhang | G06F 1/3206 713/330 |
| 2016/0132096 A1* | 5/2016 | Allen-Ware | G06F 1/3287 713/323 |
| 2019/0041930 A1* | 2/2019 | Livingston | G06F 1/26 |
| 2019/0041942 A1* | 2/2019 | Keceli | G06F 1/3206 |
| 2019/0108087 A1* | 4/2019 | Biran | G06F 1/324 |
| 2019/0310698 A1* | 10/2019 | Mehra | G06F 1/329 |
| 2019/0317770 A1* | 10/2019 | Sankaralingam | G06F 15/825 |
| 2019/0384603 A1* | 12/2019 | Kim | G06F 1/3243 |
| 2020/0050251 A1* | 2/2020 | Naik | G06F 9/3869 |
| 2020/0073461 A1* | 3/2020 | Sadowski | G06F 1/329 |
| 2020/0310516 A1* | 10/2020 | Webel | G06F 1/28 |
| 2020/0371575 A1* | 11/2020 | Garcia-Tobin | G06F 9/3836 |
| 2021/0103323 A1* | 4/2021 | Chakravarty | G06F 1/3243 |
| 2021/0116982 A1* | 4/2021 | Khanna | G06F 1/3287 |
| 2021/0303359 A1* | 9/2021 | Park | G06F 9/5066 |
| 2022/0269298 A1* | 8/2022 | Rapaka | G06F 1/305 |
| 2022/0350775 A1* | 11/2022 | Volpe | G06F 7/505 |
| 2022/0404886 A1* | 12/2022 | Parashurama | G06F 1/3243 |
| 2023/0297432 A1* | 9/2023 | Whatmough | G06F 1/3234 718/104 |
| 2023/0350696 A1* | 11/2023 | Harwani | G06F 1/206 |

* cited by examiner

| Previous series | Next series | Power assoc. with next series |
|---|---|---|
| LOAD | MULTIPLY | high |
| MULTIPLY | STORE | low |
| STORE | LOAD | low |
| | | |

FIG. 14

| Observed operation | Current series of operations | Confidence counter after observing operation |
|---|---|---|
| MULTIPLY | MULTIPLY | 0 |
| MULTIPLY | MULTIPLY | 0 |
| STORE | MULTIPLY | 1 |
| MULTIPLY | MULTIPLY | 0 |
| STORE | MULTIPLY | 1 |
| STORE | MULTIPLY | 2 |
| STORE | STORE | 1 |
| STORE | STORE | 0 |

FIG. 13

DATA PROCESSING APPARATUS WITH SELECTIVELY DELAYED TRANSMISSION OF OPERANDS

BACKGROUND

Technical Field

The present technique relates to the field of data processing. In particular, the present technique relates to data processing apparatuses comprising a plurality of processing elements.

Technical Background

The power consumption of a data processing apparatus may vary by large amounts in a short period of time. These variations may include sudden increases in power consumption at the start of a workload and sudden decreases in power consumption at a pause in execution. Rapid changes in power consumption can cause problems in a processing apparatus, since the rate of change of power consumption may be associated with a magnitude of voltage noise, and therefore rapid changes in power consumption may be associated with high amounts of voltage noise. Data processing apparatuses may also comprise several processing elements, for example to perform matrix processing operations. For these processing apparatuses, the magnitude of sudden power changes may be amplified since several operations may be started or stopped at the same time. It would be desirable to provide a data processing apparatus with reduced voltage noise. It would also be desirable for the reduction in voltage noise to be achieved whilst minimising the impact to performance and overhead.

SUMMARY

Viewed from one aspect, the present technique provides a data processing apparatus, comprising:
  operand routing circuitry configured to prepare operands for processing;
  a plurality of processing elements, each processing element comprising receiving circuitry configured to receive operands, processing circuitry configured to perform processing operations based on the received operands, and transmitting circuitry configured to transmit a subset of the received operands to a further processing element, wherein a group of coupled processing elements comprises a first processing element configured to receive operands from the operand routing circuitry and one or more further processing elements for which the receiving circuitry is coupled to the transmitting circuitry of another processing element in the group, such that the group of coupled processing elements is arranged to perform processing operations which take as inputs one or more input operands wherein each of the input operands is initially received from the operand routing circuitry at the first processing element; and
  timing circuitry, configured to selectively delay transmission of operands within the group of coupled processing elements to cause operations performed by the group of coupled processing elements to be staggered.

Viewed from a further aspect, the present technique provides a data processing method, comprising:
  preparing, with operand routing circuitry, operands for processing;
  transmitting operands to a first processing element of a group of coupled processing elements, each processing element comprising receiving circuitry configured to receive operands, processing circuitry configured to perform processing operations based on the received operands, and transmitting circuitry configured to transmit a subset of the received operands to a further processing element, wherein the group of coupled processing elements comprises the first processing element configured to receive operands from the operand routing circuitry and one or more further processing elements for which the receiving circuitry is coupled to the transmitting circuitry of another processing element in the group, such that the group of coupled processing elements is arranged to perform processing operations which take as inputs one or more input operands wherein each of the input operands is initially received from the operand routing circuitry at the first processing element; and
  selectively delaying, with timing circuitry, transmission of operands within the group of coupled processing elements to cause operations performed by the group of coupled processing elements to be staggered.

Viewed from a further aspect, the present technique provides a non-transitory computer-readable medium to store computer-readable code for fabrication of a data processing apparatus, comprising:
  operand routing circuitry configured to prepare operands for processing;
  a plurality of processing elements, each processing element comprising receiving circuitry configured to receive operands, processing circuitry configured to perform processing operations based on the received operands, and transmitting circuitry configured to transmit a subset of the received operands to a further processing element, wherein a group of coupled processing elements comprises a first processing element configured to receive operands from the operand routing circuitry and one or more further processing elements for which the receiving circuitry is coupled to the transmitting circuitry of another processing element in the group, such that the group of coupled processing elements is arranged to perform processing operations which take as inputs one or more input operands wherein each of the input operands is initially received from the operand routing circuitry at the first processing element; and
  timing circuitry, configured to selectively delay transmission of operands within the group of coupled processing elements to cause operations performed by the group of coupled processing elements to be staggered.

Further aspects, features and advantages of the present technique will be apparent from the following description of examples, which is to be read in conjunction with the accompanying drawings.

BRIEF DESCRIPTION OF THE DRAWINGS

FIG. 13 illustrates a process of using counter circuitry to update an indication of a current series of operations.

FIG. 14 illustrates an example of a prediction table.

DESCRIPTION OF EXAMPLES

Figure 1:
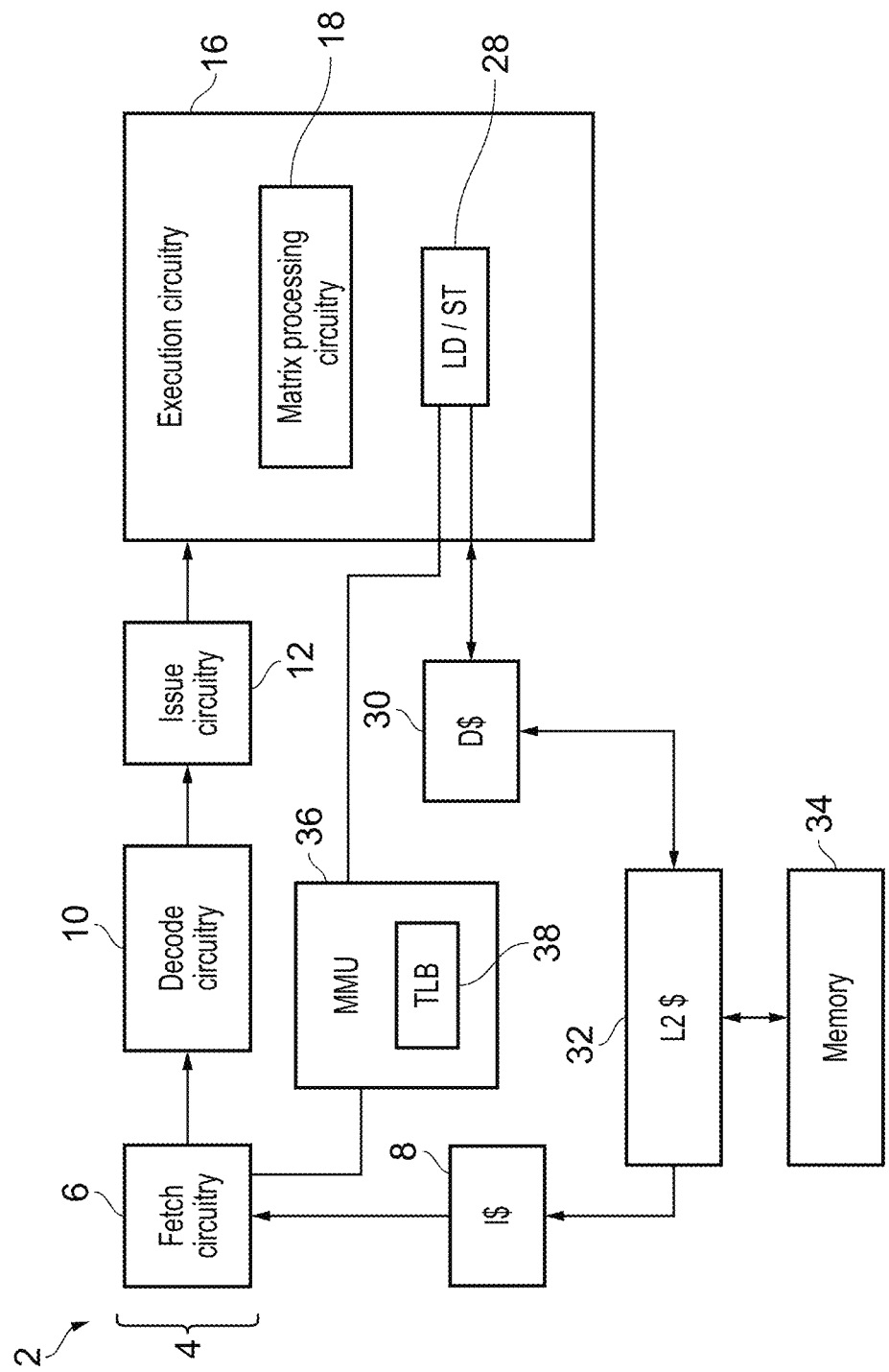
FIG. 1 schematically illustrates an example of a data processing apparatus.

A data processing apparatus according to the present technique comprises operand routing circuitry configured to prepare operands for processing. For example, operands identified by decoded instructions may be fetched from registers or memory and provided to the operand routing circuitry. The operand routing circuitry may then be configured to provide the operands to certain processing elements such that processing operations can be performed on the operands in response to the instructions. The processing elements comprise receiving circuitry configured to receive operands, processing circuitry configured to perform processing operations based on the received operands, and transmitting circuitry configured to transmit a subset of the received operands to a further processing element. The subset of the received operands may be all of the received operands, or it may be a proper subset comprising fewer operands than were provided to the processing element. By providing receiving and transmitting circuitry in the processing elements, operands can be passed between a group of coupled processing elements. There may be one group of processing elements in the data processing apparatus, or there may be several groups of processing elements. Each group of processing elements comprises a first processing element configured to receive operands from the operand routing circuitry and one or more further processing elements having their receiving circuitry coupled to the transmitting circuitry of another processing element in the group. For example, there may be a second processing element having its receiving circuitry coupled to the transmitting circuitry of the first processing element, a third processing element coupled to the second processing element and so on. In such an arrangement the group of coupled processing elements performs processing operations which take as inputs operands which were initially provided to the first processing element by the operand routing circuitry. Therefore, in some examples every operand used by the group of coupled processing elements is provided to the group of processing elements by the operand routing circuitry via the first processing element. The operands used by a particular processing element in the group may be initially received by the first processing element and then passed down the group of processing elements to the particular processing element. This arrangement means that the operand routing circuitry only needs to provide the operands to one or more first processing elements, from which they will be passed to the further processing elements. By not directly providing operands to processing elements other than the first processing elements, the operand routing circuitry is simplified significantly. In particular, this arrangement may allow the processing elements to be abutted in the floor plan of the data processing apparatus, avoiding channels reserved for routing in the floor plan. This is associated with a reduction in dynamic power compared to examples in which operands are routed directly to each processing element or a larger set of the processing elements. Routing operands by passing them down groups of coupled processing elements also enables a technique for reducing the voltage noise in the data processing apparatus which has a reduced impact on performance. In particular, this may be achieved by providing timing circuitry. Timing circuitry may be provided to selectively delay transmission of operands within a group of coupled processing elements. By delaying transmission of operands to processing elements, operations based on the delayed operands may also be delayed. This means that the timing circuitry may cause operations performed by the group of coupled processing elements to be staggered. Rather than each processing element receiving operands and beginning operations based on those operands at the same time, the delaying of transmission of operands through the group of coupled processing elements means that different processing elements in the group may receive operands and begin processing at different times. This can be associated with reduced voltage noise at the start and end of a workload, since large numbers of operations may not start or finish at the same time, and therefore the change in power consumption is spread over a larger time, reducing the rate of change of power consumption. In addition, the technique may be associated with reduced overhead compared to an example in which the timing of operations is controlled based on when the operands are issued to processing elements (such as limiting execution bandwidth at the beginning of power increase events) since, in the present technique, the operands for a given group of operations (for example, a group of operations carried out in response to a single instruction) may be all provided to the group of coupled processing elements at the same time by the operand routing circuitry. After providing the operands to the processing elements, the timing of the operations is handled by the receiving/transmitting and timing circuitry, meaning that no further complexity is required for routing the operands from the operand routing circuitry at particular times. As discussed, the technique is associated with reduced voltage noise on power reduction events, since when processing operations stall and no new processing operations are communicated to the processing circuitry (such as due to a cache miss), certain processing operations based on operands which have been delayed by the timing circuitry may still be ongoing, and therefore there may be no sudden drop in power consumption, and therefore reduced voltage noise. It may be difficult to avoid voltage noise associated with power reduction using other techniques, such as techniques based on modifying the issue queue, since power reduction events can be difficult to predict and therefore avoid (for example, power reduction events may be caused by unpredictable cache misses). Hence, provision of the timing circuitry to delay transmission of operands between processing elements of a group of coupled processing elements can provide reduced voltage noise caused by both power increase and power decrease events.

The processing elements, for example each processing element, may comprise storage circuitry for storing the result of operations performed by the processing circuitry, e.g. of that processing element. The results of operations performed on operands received at the receiving circuitry of a given processing element may be stored in the storage circuitry of that given processing element, for example. The result may be read directly from the processing element which is known to store the result, and therefore the results may not be passed between processing elements. This means that the results of calculations remain in the same physical location, and are not passed along the group of coupled processing elements (as the operands are). Keeping the results in the same location simplifies locating the results of the calculations when they are read, and in particular means that the location of the results does not depend on a type of calculation that is performed.

In some examples, the storage circuitry in each processing element having storage circuitry comprises an architectural register.

The timing circuitry may be provided in different ways. For example, a buffer could be provided at one or more of the processing elements. Each operand could be provided to the buffer circuitry in the group of processing elements simultaneously, for example the receiving and transmitting circuitry at each processing circuitry could be arranged to transmit the operands among the group in a single clock cycle, and the delay could then be achieved by storing the received operands in the buffer for a variable amount of time prior to transmitting the operands to the processing circuitry of the respective processing element. However, in an alternative example one or more of the processing elements comprise delaying circuitry. The delaying circuitry may be part of the timing circuitry, and may be arranged to introduce a delay between receiving operands at the receiving circuitry of a given processing element and transmitting the subset of the received operands at the transmitting circuitry of that given processing element. Therefore, the transmission of operands is delayed as the operands are passed within the group of coupled processing elements so that the operands arrive at certain processing elements later (for example, in a later clock cycle) than they arrive at other processing elements in the group. A result of this is that operations based on the delayed transmitted operands may be performed later than operations based on those operands at the processing element which caused them to be delayed (for example, if operations are performed as soon as the operands are available). This allows operations to be spread out over time, and reduce the voltage noise issue as discussed above.

The delaying circuitry may be controlled in several ways. For example, operands could be delayed by the delaying circuitry until a message signal is received indicating that the operands should be transmitted. However, a simpler configuration may be achieved if the delaying circuitry is controlled in dependence on a clock signal, applying a delay based on the clock signal. For example, the delaying circuitry could introduce a delay between receiving operands at the receiving circuitry and transmitting the operands at the transmitting circuitry equal to a predetermined number of clock cycles. The predetermined number could be communicated to the delaying circuitry in advance, for example. However, in an alternative configuration the delaying circuitry may introduce a delay of (up to) a single clock cycle, causing the operands to be transmitted on the next clock cycle following receiving the operands at the receiving circuitry. Such a delay could be implemented through the use of one or more flip-flops (such as a D flip-flop), such that the delaying circuitry comprises one or more flip-flops arranged between the receiving circuitry and the transmitting circuitry, controlled on the basis of a clock signal. Each flip-flop could, for example, cause a value signalled to the processing element at the receiving circuitry to be transmitted via the transmitting circuitry at a predetermined part (such as a rising edge) of each clock signal, such that the transmission of the operands is delayed until the next clock signal. Since this delay is implemented by the delaying circuitry on the basis of the clock signal, no further control is required to delay the transmission of operands within each group of coupled processing elements and therefore no further control is required to suppress voltage noise.

As discussed above, the voltage noise issue arises due to sudden increases or decreases in power consumption, and staggering operations performed by a plurality of processing elements can reduce the rate of change of power consumption to reduce voltage noise. However, staggering operations can increase the amount of time to complete a series of operations when compared to performing all of the operations at once. In addition, some operations performed by the processing elements may be associated with low power consumption. For example, a read operation to store one or more operands provided to a given processing element in registers of that given processing element may be associated with low power consumption, since no arithmetic operations may be required to complete the operation. Due to the low power consumption of certain operations, it may be possible to perform several of these lower-power operations at once without a significant increase in power consumption, and therefore without causing large voltage noise. It may be undesirable for performance for the delaying circuitry to cause lower-power operations to be staggered, since the staggering may increase the time to complete a series of operations and the delaying may not be necessary for the reduction of voltage noise (the voltage noise created by starting processing of the lower-power operations simultaneously may be below a safe threshold level, for example). Therefore, some examples of the data processing apparatus may comprise bypass circuitry which is controllable to cause the transmission of received operands to bypass the delaying circuitry. That is, via the bypass circuitry the transmitting circuitry may transmit received operands immediately (such as within the same clock cycle) as they are received (such as by being directly connected to the receiving circuitry and allowing the received operands to pass through the processing element). For example, the bypass circuitry could comprise a multiplexer which selects between a path from the receiving circuitry to the transmitting circuitry comprising the delaying circuitry, and an alternative path not comprising the delaying circuitry. Therefore, providing bypass circuitry to bypass the delaying circuitry can lead to improved performance overall, since processing delays are reduced for certain operations whilst protection against voltage noise may still be provided by the delaying circuitry for other operations. In some examples, the bypass circuitry may only bypass the delaying circuitry in some processing elements and not in others. This may be the case where lower power consumption allows some operations to be performed simultaneously but is too high to allow all operations to be performed simultaneously. In addition, after each processing element is running, the delaying circuitry may be bypassed, since there may be no further increase in power possible.

To take advantage of the performance benefits of the bypass circuitry whilst retaining the protection against voltage noise, the bypass circuitry may be controlled by bypass control circuitry. The bypass control circuitry may control the bypass circuitry in dependence on an estimated power consumption associated with operations to be performed by the plurality of processing elements. For example, if the bypass control circuitry estimates that a future series of operations has higher power consumption, then the bypass circuitry in one or more of the processing elements may be controlled to cause the bypass circuitry to not bypass the delaying circuitry, so that the delaying circuitry delays transmission of operands for those higher power operations and causes the operations to be staggered, reducing the increase in power consumption and therefore voltage noise. Likewise, if the bypass control circuitry estimates that a future series of operations has lower power consumption, then the bypass circuitry in one or more of the processing elements may be controlled to cause the bypass circuitry to bypass the delaying circuitry, resulting in improved performance. Lower and higher power may be defined with reference to certain thresholds. In addition, the bypass control circuitry may not estimate an actual power consumption associated with a given series of operations, but may instead classify an operation or a series of operations based on whether they are associated with higher or lower power consumption. Then, the bypass control circuitry may control the bypass circuitry based on whether a future operation is classified as a higher or a lower power operation rather than based on an actual power consumption estimation. The bypass control circuitry may be configured to control the bypass circuitry to selectively bypass the delaying circuitry at a time when the operands for the future series of operations are being passed between processing elements. Therefore, the bypass circuitry may be configured in advance of the operands being provided to a group of coupled processing elements to provide the reduction in sudden power increase. In some examples the bypass circuitry may need to be configured before it is known what the next operation will be. Hence, in some examples the apparatus may predict a future series of operations in order to configure the bypass circuitry.

In some examples, the bypass control circuitry comprises prediction circuitry configured to predict a future series of operations based on an observed series of operations. In certain workloads, it may be common for a particular type of operation to be followed by another type of operation. For example, in an outer product workload a series of load operations to load data into one or more processing elements may be commonly followed by a series of multiply accumulate operations at those processing elements. Hence, by observing a current series of operations, the bypass control circuitry may predict a future type of operation, and may control the bypass circuitry on the basis of the power consumption associated with the future series of operations. In some examples, the bypass control circuitry may not predict the actual type of future operations, but may identify that a particular type of operation is commonly followed by a high/low power series of operations.

The prediction circuitry may be of any design which can associate an observed series of operations with a future series of operations. In one example, the prediction circuitry comprises a prediction table in which the observed series of operations are associated with a corresponding future series of operations. Hence, the prediction circuitry can reference the prediction table based on an observed series of operations, read the corresponding future series of operations from the entry of the table corresponding to the observed series of operations to predict which operations will follow the observed series of operations, and based on the power consumption associated with the predicted future series of operations control the bypass circuitry. In case there are no entries in the prediction table corresponding to the observed series of operations, a default bypass control state based on the observed series of operations may be selected. In some cases, to minimise the chance of a high voltage noise event, the default state may be to avoid bypassing the delaying circuitry, even though this may be associated with increased latency. The prediction table may be updated based on observed operations, such as observed pairs of consecutive series of operations. For example, two consecutive series of operations may comprise a first series of operations and a subsequent series of operations. The prediction table may be updated so that for an entry where the "observed series of operations" corresponds to the first series of operations, the "future series of operations" is updated to be the subsequently observed series of operations. New entries can be added to the table in a similar manner. If the prediction table is full with valid entries, then the oldest non-hit entry may be selected for eviction. In addition, the prediction table may be arranged such that there is only one entry per "observed series of operations" to maintain a one-to-one relationship between each observed series of operations and a future series of operations. Updating the prediction table based on observed operations enables the prediction of future series of operations to vary dynamically and to be based on which workloads are being executed by the data processing apparatus at a particular time, enabling more accurate prediction.

There may be several ways to determine the current observed series of operations. In systems in which operations of one type are strictly executed together, a new series of operations may be identified when an individual operation not belonging to the current series of operations is observed. An operation may be observed at the decode stage or another position in the processing pipeline, for example. However, for certain data processing apparatuses, particularly out-of-order processors, operations may be executed in a different order to the program code. In these systems it may be incorrect to determine that the current series of operations has changed when only a single operation (or small number of operations) of a different kind has been observed, since it may be an odd one out. The single operation could therefore be considered noise in the observations of operations, and may not be used for changing the indication of a currently observed series of operations. In some examples, the prediction circuitry may comprise counter circuitry. The counter circuitry may be updated based on a type of observed individual operation, and the indication of the currently observed series of operations could be updated in response to the counter circuitry reaching a threshold value. For example, if there were a series of operations of a type A being executed and the current indication of the series of operations were type A, then a counter may be incremented each time an operation of a type B is observed until a threshold value is reached, at which point the indication of the current series of operations may be updated to the type B. In some examples, a counter may be provided for series of operations. In some examples, a counter may be decremented each time an operation not being tracked by that counter is observed (e.g. for a counter tracking operations of a type B, an operation of type B may cause the counter to be incremented and an operation of type A or any other type may cause the counter to be decremented). A "series of operations" may include operations of more than one type. In addition, a "series of operations" may be defined by more than just the type of operation. For example, the execution bandwidth (the number of processing elements involved in a particular series of operations) may be used to classify a series of operations. For example, a multiply-accumulate series of operations with 100% bandwidth may be classified differently to a multiply-accumulate series of operations with 50% bandwidth, since the latter may be associated with lower power consumption and therefore the decision regarding bypassing the delaying circuitry may be different for the two series of operations. Hence, additional parameters such as execution bandwidth may be monitored. Different entries in the prediction table may be assigned to the two different series of operations comprising the same type of operation with different execution bandwidth.

As a particular example, read and write operations (or move operations) may be particularly associated with a low power consumption, since these operations may involve only limited use of the logic of the processing circuitry. Hence, when the prediction circuitry predicts that a future series of operations to be performed by a group of processing elements includes read and write operations, then the bypass control circuitry may control the bypass circuitry to bypass the delaying circuitry for improved performance. When the prediction circuitry predicts that a future series of operations comprises operations other than read and write operations (such as multiply accumulate operations), then the bypass control circuitry may control the bypass circuitry to avoid bypassing the delaying circuitry for those operations, so that voltage noise can be suppressed.

In some examples, the input operands for a particular operation or group of operations to be performed by the group of coupled processing elements may be input into the first processing element together. For example, the operands for a group of operations associated with a single instruction (such as a vector or matrix processing instruction) may be input together. Then, the individual operations which comprise that group of operations may be staggered by the selective delaying carried out by the timing circuitry.

In some examples the coupled group of processing elements is configured to perform a vector operation in response to a vector instruction. The vector operation may involve several calculations, each corresponding to an element in a result vector. Each calculation corresponding to a vector element may be carried out at a separate processing element, so that the elements of the result vector of the vector operation are stored in the storage circuitry of separate processing element. The operands for the vector operation may be provided from the operand routing circuitry to the first processing element in the group of coupled processing elements together in a single clock cycle. The operands may include two or more values corresponding to different vector elements of the same vector, so that operands corresponding to operations performed at different processing elements are provided to the group of coupled processing elements together.

As the set of operands provided to the group of coupled processing elements together, and passed down the group of processing elements together, includes operands corresponding to operations to be performed at several different processing elements, the processing elements may comprise operand selection circuitry. The operand selection circuitry for a given processing element may perform a selection of a subset of operands from the operands received at the receiving circuitry of the given processing element, the subset including the operands to be used in a processing operation to be performed by the given processing element. In some examples, one or more of the operands selected by the operand selection circuitry may be excluded from the subset of operands to be transmitted by the processing element. For example, a value that is not to be used by any further processing elements may be excluded from the subset of transmitted operands.

In some examples, the data processing apparatus is configured to perform matrix processing operations. In these examples, the processing elements may form a logical array of processing elements configured to produce a matrix output, where each processing element corresponds to an element of the matrix output. The physical location of the processing elements may be entirely unrelated to the logical location of the data stored at that processing element in the logical array. The group of coupled processing elements may correspond to a row or column of the logical array of processing elements. The elements in a row or column of an array may be more likely to be calculated using one or more shared operands than elements which are not in the same row or column (e.g. in an outer product operation each element in a row or column may be multiplied by the same value, so the value may be reused for several calculations corresponding to that row or column). Therefore, processing elements corresponding to a row or column of an array provide a particularly suitable selection of processing elements for a group of coupled processing elements, due to the operations performed by the processing elements being more likely to share operands, reducing the total number of distinct operands which need to be provided to the group of coupled processing elements.

As mentioned above, one operation that may be performed by a plurality of processing elements is an outer product operation between a first vector and a second vector, producing a result matrix. When the data processing apparatus described herein is used to perform an outer product operation, each element of the result matrix may correspond to a processing element, and each row of the result matrix may correspond to a group of coupled processing elements such that there are N groups of coupled processing elements where N is the number of rows. In such a configuration, the outer product operation may be performed by providing a set of input operands to each of the N groups of coupled processing elements. The input operands may all be provided in a single clock cycle, although due to the delaying nature of the timing circuitry may reach each processing element in each group of coupled processing elements at a later clock cycle. The set of input operands provided to each group of coupled processing elements in this example may include one element from the first vector and each element of the second vector. The one element of the first vector may be used at each processing element, for example, whereas each of the elements of the second vector may only be used at one of the processing elements.

In one example, in at least one mode of operation at least two processing elements in the group of coupled processing elements are configured to perform overlapped execution of operations based on operands that have been received at the first processing element in different processing cycles. That is, certain processing elements in the group of coupled processing elements may perform operations based on operands that were transmitted to the group in a given clock cycle, and different processing elements in the group of coupled processing elements may perform operations based on operands that were transmitted to the group in a later clock cycle.

Particular examples will now be described with reference to the Figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file and issuing micro-operations for execution once the required operands for a given micro-operation are available, and an execute stage 16 for executing data processing operations corresponding to the micro-operations. It will be appreciated that this is merely one example of a possible pipeline arrangement, and other systems may have additional stages or a different configuration of stages. For example in an out-of-order processor a register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 may include a number of processing units, for executing different classes of processing operation. For example the execution units may include a matrix processing unit 18 for processing vector and matrix operations on vectors and matrices comprising multiple data elements and a load/store unit 28 for performing load/store operations to access data in a memory system 8, 30, 32, 34. Other examples of processing units which could be provided at the execute stage include a scalar processing unit (e.g. comprising a scalar arithmetic/logic unit (ALU) for performing arithmetic or logical operations on scalar operands read from the registers), a floating-point unit for performing operations involving values represented in floating-point format, and/or a branch unit for processing branch instructions.

A memory management unit (MMU) 36 controls address translations between virtual addresses (specified by instruction fetches from the fetch circuitry 6 or load/store requests from the load/store unit 28) and physical addresses identifying locations in the memory system 34, based on address mappings defined in a page table structure stored in the memory system. The page table structure may also define memory attributes which may specify access permissions for accessing the corresponding pages of the address space, e.g. specifying whether regions of the address space are read only or readable/writable, specifying which privilege levels are allowed to access the region, and/or specifying other properties which govern how the corresponding region of the address space can be accessed. Entries from the page table structure may be cached in a translation lookaside buffer (TLB) 38 which is a cache maintained by the MMU 36 for caching page table entries or other information for speeding up access to page table entries from the page table structure shown in memory.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline arrangement, and the processor may include many other elements not illustrated for conciseness.

Figure 2:
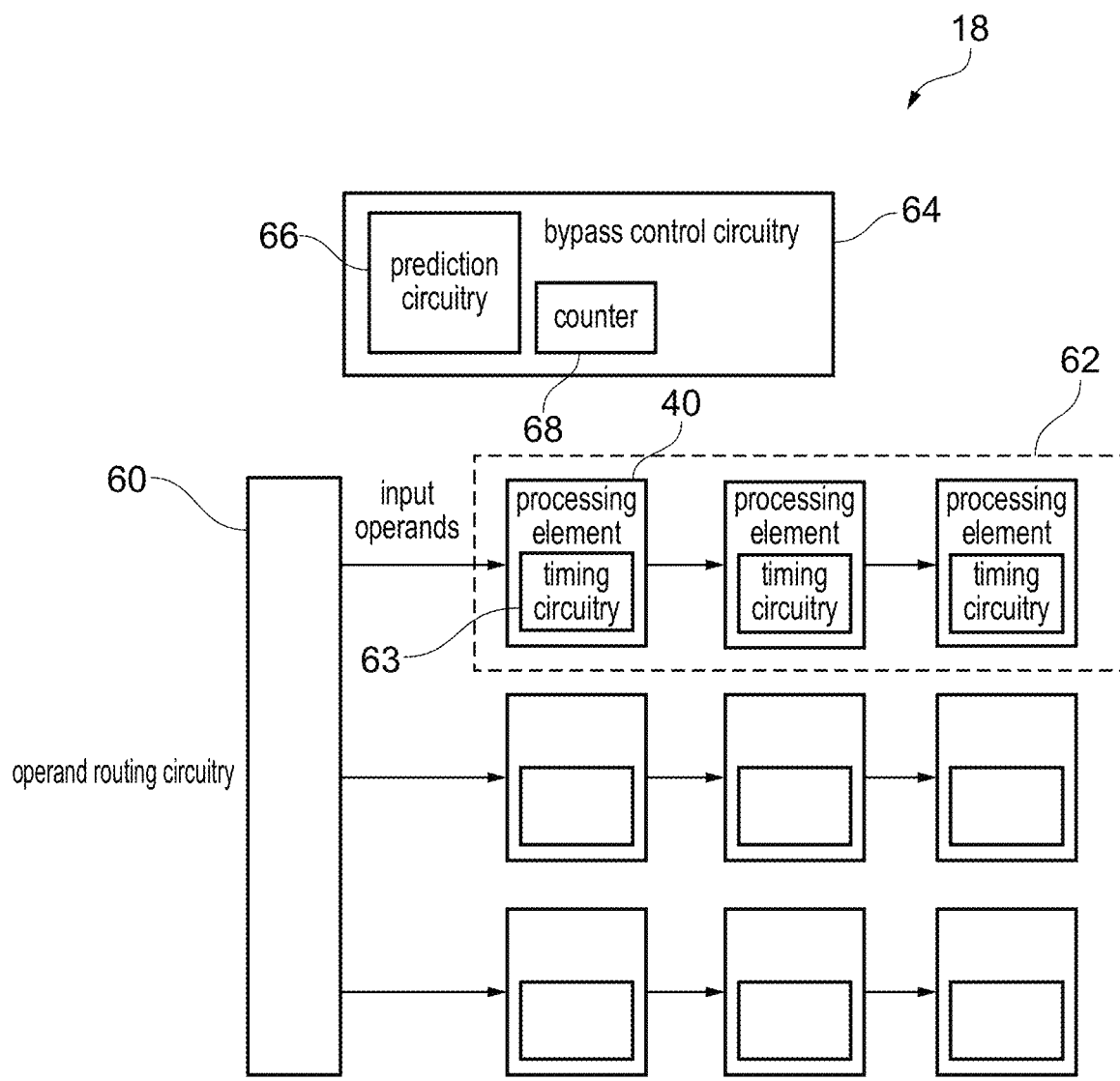
FIG. 2 schematically illustrates an example of matrix processing circuitry.

FIG. 2 illustrates a particular example of the matrix processing circuitry 18. The processing circuitry comprises a plurality of processing elements 40. Whilst nine processing elements 40 are shown, it will be appreciated that this is not a limiting number, and different amounts of processing elements may be provided. An example of a processing element is illustrated in FIG. 3.

Figure 3:
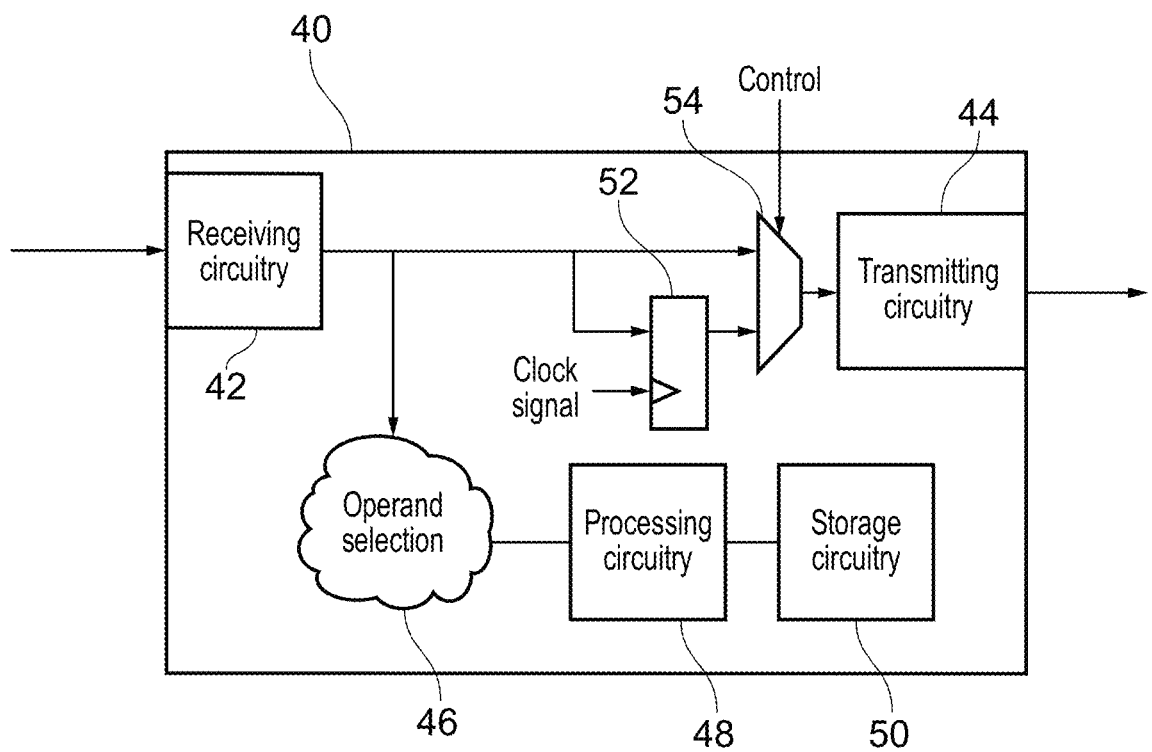
FIG. 3 schematically illustrates an example of a processing element which may be provided as part of the matrix processing circuitry.

As shown in FIG. 3, the processing elements may comprise receiving circuitry 42 for receiving operands and transmitting circuitry 44 for transmitting at least a subset of the received operands. It will be appreciated that there may be certain processing elements 40 (for example, one per group 62 of coupled processing elements) which do not include the transmitting circuitry 44, for example the rightmost processing element 40 illustrated in each row shown in FIG. 2, where there are no further processing elements to transmit operands to. Alternatively, the transmitting circuitry 44 may be present, but unused. The operands may be received at the receiving circuitry 42 from operand routing circuitry 60, or from the transmitting circuitry 44 of another processing element 40. Each processing element 40 may comprise operand selection circuitry 46 to select which (if any) of the received operands should be transmitted to the processing circuitry 48 of the processing element 40. The selection may be based on an operand selection information transmitted to the processing element 40, based on the instructions which have been issued by the issue circuitry 12. The processing element 40 may also comprise processing circuitry 48 for performing operations based on the operands selected by the operand selection circuitry 46. The processing circuitry 48 may perform operations based on information transmitted to the processing element 40 identifying which operations should be performed (for example, the information may be transmitted from the issue circuitry). Outputs of the processing operations performed by the processing circuitry may be stored in the storage circuitry 50 to be read in a later operation. In some examples, the storage circuitry 50 comprises registers of the data processing apparatus 2. The processing circuitry 48 may perform operations which take, in addition to or instead of operands received at the receiving circuitry 42, values stored in the storage circuitry 50. In an example operation, two operands provided to the processing element 40 via the receiving circuitry 42 may be combined in an arithmetic operation and the result accumulated with a value previously stored in the storage circuitry 50, for example.

Returning to FIG. 2, the processing elements 40 may be arranged in groups 62 of coupled processing elements, where a group 62 of coupled processing elements 40 comprises a first processing element configured to receive operands from the operand routing circuitry 60 and one or more further processing elements for which the receiving circuitry 42 of one processing element 40 is coupled to the transmitting circuitry 44 of another processing element in the group, such that the group of coupled processing elements is arranged to perform processing operations which take as inputs one or more input operands with each of the input operands being initially received from the operand routing circuitry 60 at the first processing element. The number of processing elements per group is not particularly limited, and in particular different groups in the same processing apparatus could comprise different numbers of processing elements. The flow of operands in FIG. 2 is illustrated by arrows, which indicate that operands are transmitted from the operand routing circuitry 60 to a first processing element 40 in each group 62, and then via that first processing element to a second processing element, then to a third processing element, and so on. In this way, operands are provided to each processing element 40 in the group 62 by routing the operands first to a single processing element. Therefore, the operand routing circuitry 60 does not need to be configured to route operands to the processing elements 40 other than the first processing element in each group, which may considerably simplify the circuitry for routing and reduce the area requirements of the operand routing circuitry. In addition, each processing element only has to forward operands to one single next processing element. Therefore, there is no routing to be determined at each individual processing element.

The data processing apparatus 2 also comprises timing circuitry 63, for example the timing circuitry 63 may be included in the processing elements 40 as delaying circuitry 52. The timing circuitry 63 may also comprise the bypass control circuitry 64. The timing circuitry 63 may comprise delaying circuitry such as one or more flip-flops 52 as illustrated in FIG. 3 (whilst one flip-flop is shown, it will be appreciated that a number of flip-flops can be provided together for delaying an input comprising several bits). The delaying circuitry 52 is arranged between the receiving circuitry 42 and the transmitting circuitry 44 and is configured to delay transmission of received operands. In the case of the delaying circuitry comprising a flip-flop, the flip-flop comprises a signal input and a signal output. The flip-flop is also configured to receive a clock signal. At a particular point indicated by the clock signal, for example at the rising edge of each clock cycle, the flip-flop may be configured to cause the value signalled at the input to be signalled at the output. Therefore, the transmission of values signalled to the flip-flop may be delayed until a particular point indicated by the clock signal. In this way, operands signalled to the receiving circuitry 42 of the processing element 40 can be delayed at the processing element 40 before being signalled by the transmitting circuitry 44 to a further processing element 40 at a subsequent clock cycle.

An effect of delaying the transmission of received operands by the processing elements is that operations which take the operands as inputs may be delayed until the operands are received. If a set of operands were provided to the group of coupled processing elements together, then some operations based on the operands in the set may be performed at different times than other operations based on the set of operands. The operations may be considered to be staggered. It will be discussed later how the delaying of the timing circuitry may be considered to be selective, since in certain cases the delaying circuitry may be bypassed and therefore no delay may be imposed for a particular processing element 40.

Figure 4:
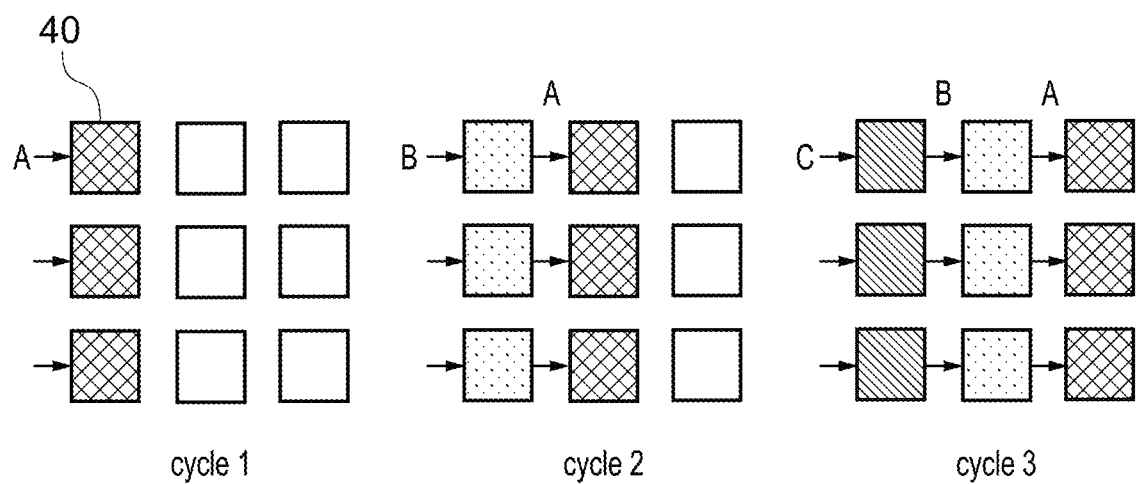
FIGS. 4 and 5 illustrate examples of the start and end of workloads performed by a plurality of processing elements.

Staggering processing operations can lead to a reduction in voltage noise. This is illustrated in FIG. 4, which shows an example in which a data processing apparatus comprising nine processing elements 40 starts processing a workload. The sections of FIG. 4 illustrate the data processing apparatus at subsequent clock cycles. At the start of a processing workload, each processing element 40 may be inactive, and therefore have a very small (or zero) power consumption. If an instruction were received for performing a vector or matrix operation, then all nine of the processing elements could be selected to perform an operation comprising part of the instruction. For example, an outer product operation may require each processing element to perform a multiplication between one vector element of a first vector and a vector element of a second vector.

In an alternative technique, the operands (data elements of the two vectors) may be provided to each processing element 40 at the same time and the operations may all begin at the same time. The power consumption of the data processing apparatus may then increase sharply as the apparatus transitions from having zero active processing elements to nine processing elements performing computationally intensive operations. As the voltage noise may be associated with the rate of change of power consumption, this sudden large increase in power consumption may be associated with an unsafe level of voltage noise.

However, since according to an example of the present technique, the processing elements are arranged in three groups of three processing elements, the operands are initially provided to the first processing element in each group, and the transmission of the operands is delayed as the operands are passed between processing elements of each group, then the sudden increase in power consumption may be slowed. Operations performed in response to the same instruction (groups of operations based on the same operands) are shown in FIG. 4 with the same shading, with blank processing elements performing no operations.

In particular, it will be seen that in the first clock cycle shown in FIG. 4, only three processing elements, each processing element being a first processing element in a group of coupled processing elements, are performing operations. The operations are based on a set of operands labelled "A". Therefore, the power consumption has increased from zero active elements to three active elements in a clock cycle. The rate of change of power consumption is therefore much lower than in the alternative example discussed above where all processing elements begin at the same time and the rate of increase is three times higher. In the second clock cycle, three further operations of the first group of operations are performed based on the "A" set of operands which have been passed to the second column of processing elements. It is also shown that three operations of a second group of operations based on operands "B" may begin (in the first column) based on a subsequently issued instruction, although this is not required. If a second group of operations does begin, then the number of active processing elements increases from 3 to 6 between the first and second clock cycles, associated with the same (or similar) increase in power consumption as between the zeroth and first clock cycles, and therefore the same level of voltage noise. If the second group of operations does not begin, then the number of active processing elements remains at 3 between the first and second clock cycles and therefore there is no increase in power consumption. Similarly, if a third group of processing operations begins in the third clock cycle based on operands "C", the power consumption again increases by three processing elements. At this stage, each processing element is active and the full bandwidth of the matrix processor is being utilised. However, rather than experiencing a sharp increase in power consumption, by delaying the transmission of operands between processing elements, the rate of change of power consumption has been suppressed and voltage noise reduced.

Figure 5:
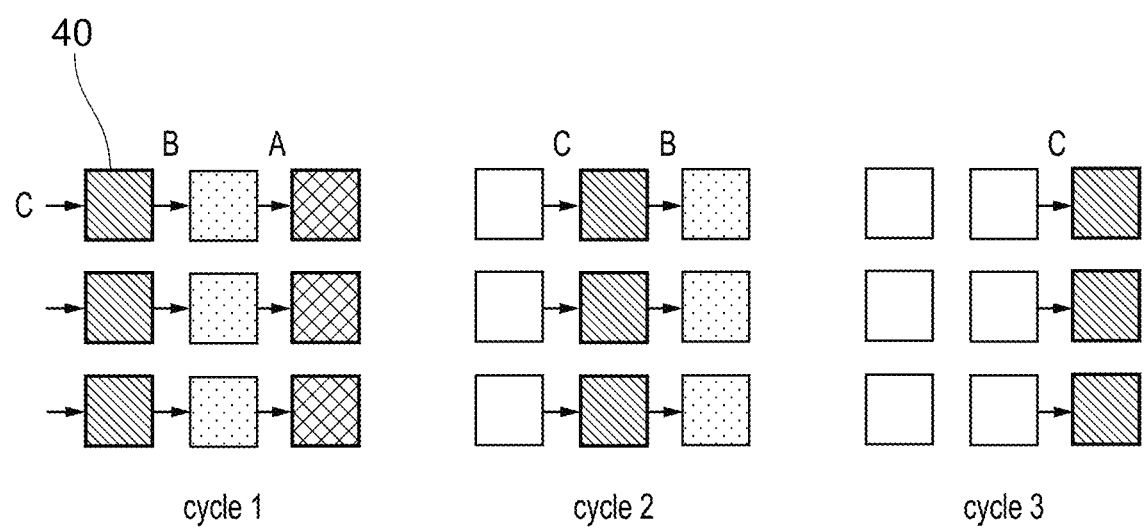

A similar effect is illustrated in FIG. 5 for decreases in power consumption. FIG. 5 illustrates the same data processing apparatus as FIG. 4, starting with each processing element 40 performing a data processing operation.

In an alternative example to the one shown in FIG. 5, each processing element could be performing an operation of the same group of operations. If there were no subsequent instruction (for example, a cache lookup for retrieving the operands for the next instruction results in a miss) then in the next clock cycle each processing element could finish the operation and be inactive, causing the power consumption to fall to zero, which would be associated with high voltage noise.

However, in a data processing apparatus according to an example of the present technique, voltage noise could be suppressed as illustrated in FIG. 5. In FIG. 5, during the first clock cycle every processing element is active, with the processing elements in different columns performing (potentially different) processing operations. The operands arrive at each column of processing elements in different cycles, due to the time taken for the operands to propagate through the columns of processing elements. After the first clock cycle, there may be no subsequent instruction, and therefore in the next clock cycle no new operands may be provided to the data processing apparatus and no new group of operations may begin. However, operations are still performed in the data processing apparatus, based on operands which have been delayed by the timing circuitry. In the second clock cycle, operands that were previously used for operations in processing elements belonging to the first column of processing elements (the "C" operands) are passed to processing elements in the second column, leading to processing operations being performed in the second column, and operands from the second column ("B") are passed to processing elements in the third column. Therefore, the number of active processing elements decreases from nine to six, which is a much smaller decrease than from nine to zero, and therefore is associated with lower voltage noise. Between the second and third clock cycles, the number of active processing elements may reduce from six to three, again illustrating a reduction of three processing elements per cycle. In some examples, a new operation could begin in the first column in the third clock cycle, and therefore there could be no reduction in power consumption at all between the second and third clock cycles.

In summary, compared to systems in which each processing element receives operands belonging to a particular set of operands (such as those associated with a single instruction) at the same time, the apparatus described herein reduces the rate of increase and decrease of power consumption by delaying the transmission of operands, and therefore can be associated with reduced voltage noise. A particular advantage of this arrangement is that a reduction in voltage noise is achieved. There is no need to modify the issue queue or artificially restrict processing bandwidth to achieve the reduction in voltage noise, and furthermore the reduction in voltage noise applies both to increases and decreases in power consumption.

Figure 6:
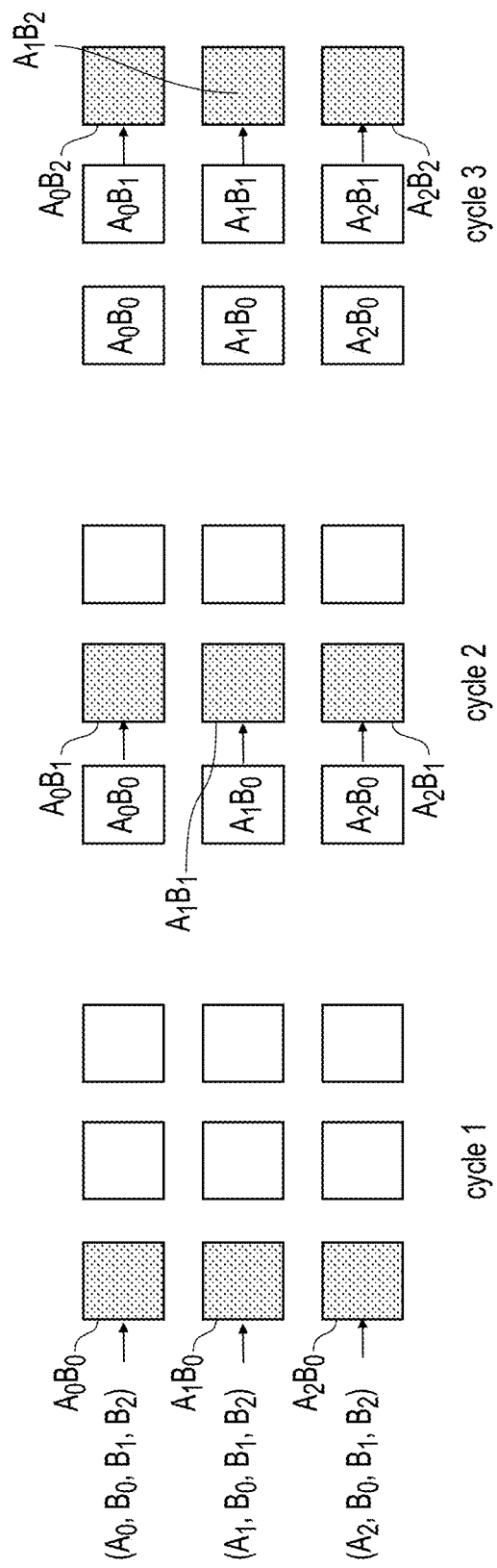
FIG. 6 illustrates an example of a staggered outer product operation.

A further example is shown in FIG. 6, applied to the particular case of an outer product operation between a vector A ($A_0$, $A_1$, $A_2$) and a vector B ($B_0$, $B_1$, $B_2$). The output of the operation is a 3*3 matrix, with each matrix element stored in the storage circuitry of a corresponding processing element. In the example of FIG. 6, the shaded processing elements 40 illustrate the active processing elements, and the values indicated on the processing elements are the result value stored in the storage circuitry of that element. In the first clock cycle, a set of operands is provided to the first processing element of each group of coupled processing elements (each row). The set of operands comprises one element of vector A and each element of vector B. In the first clock cycle, the operand selection circuitry 46 of each of the first processing elements selects the appropriate operands and applies them to the operation that they have been instructed to perform. The appropriate operands could, for instance, be the first operands that have been passed in (although other selection criteria are possible). The selection includes one element of vector A and one element of vector B. The processing circuitry 48 then multiplies the selected operands and stores the result in the storage circuitry 50. The clock signal may then indicate a new clock cycle, and the delaying circuitry may signal that the received operands are to be passed to the next processing element in each group. The operands transmitted by a given processing element may include all of the operands that were initially signalled to it, although unnecessary operands (such as $B_0$ in the case of cycle 1 shown in FIG. 6) could be excluded. In the second clock cycle, the second processing element in each group may perform a selection of operands and perform a processing operation, and so on. By the end of the third clock cycle, the storage circuitry of each processing element could store one data element of the result vector, and the matrix operation has been successfully completed. The rate of change of power consumption has been reduced by delaying the transmission of operands between processing elements.

Figure 7:
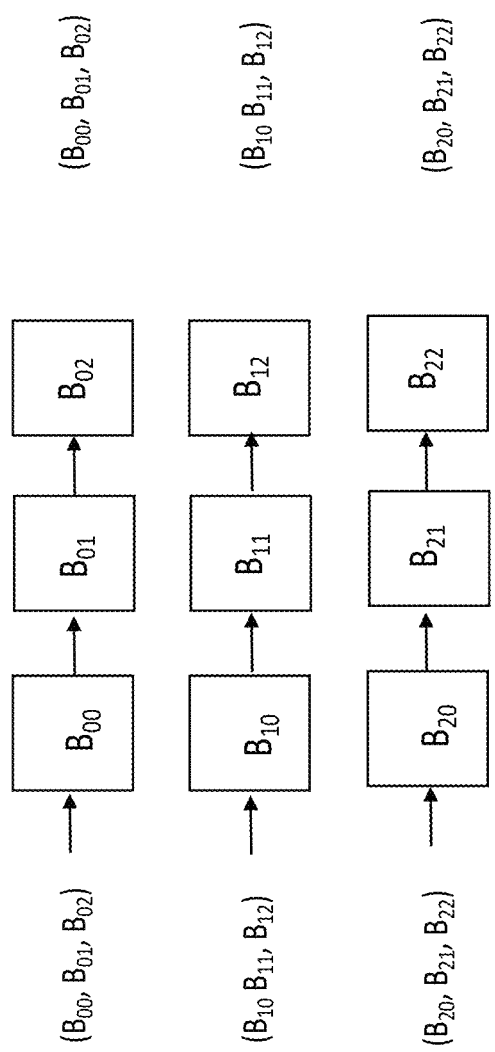
FIG. 7 illustrates an example of a matrix transpose operation.
Figure 7:
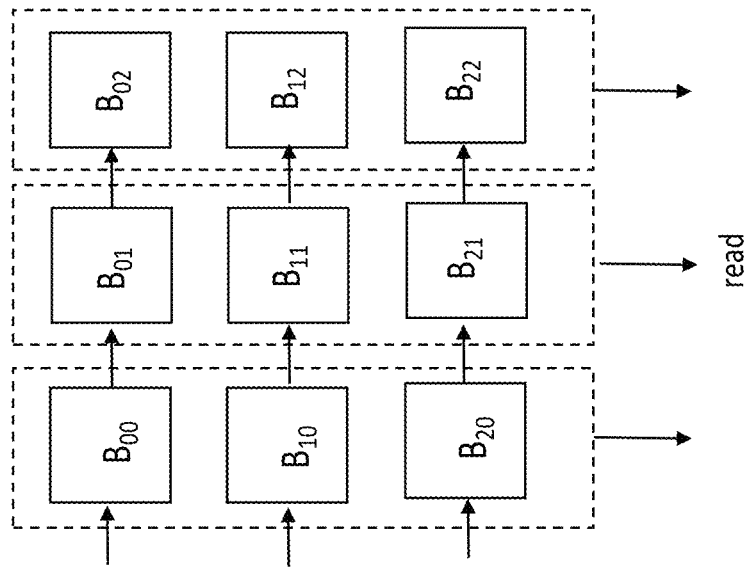

However, the number of clock cycles taken to perform the operation has been increased compared to the case where the operands are not delayed. In certain cases this increase in latency may be unavoidable since to perform the operation in less time would always be associated with a high rate of increase in power consumption. However, there may be certain operations which are associated with a lower power consumption, and for which the delaying circuitry is unnecessary. Provision of the delaying circuitry may unnecessarily cause increased latency for these instructions. Therefore, the processing elements may comprise bypass circuitry 54. The bypass circuitry may be operable to cause the transmission of operands from the transmitting circuitry 44 to bypass the delaying circuitry 52. An effect of this may be that the operands are transmitted in the same clock cycle that they are received. For a group of coupled processing elements, if the delaying circuitry is bypassed in each processing element the operands could be provided to each processing element in the group in the same clock cycle. Therefore, rather than increasing the latency of every operation, lower power operations which would not cause voltage noise above a particular threshold may bypass the delaying circuitry. An example is illustrated in FIG. 7. In FIG. 7, a matrix transpose instruction is being performed on the 3*3 matrix B. In a first group of operations, the elements of the matrix are written into the processing elements in rows. These operations involve the operand selection circuitry selecting an operand from the input operands and storing the value in the storage circuitry 50. In a second group of operations, the processing elements may be read in columns (as indicated by the dashed lines) to retrieve rows of a transposed matrix $B^T$. The operations to write data to the storage circuitry 50 and read data from the storage circuitry 50 may not be associated with high power consumption. For example, these operations may not involve any arithmetic between operands. Therefore, it may be possible to perform all nine write operations at once and all nine read operations at once. To reduce latency in these operations, the bypass circuitry could be controlled to bypass the delaying circuitry for each processing element.

As there may be some operations for which the delaying circuitry is required to avoid voltage noise and some operations for which bypassing the delaying circuitry is desired for improved performance, the bypass circuitry 54 may be controlled by bypass control circuitry 64 indicated in FIG. 2.

For example, the bypass circuitry may comprise a multiplexer selecting between a delayed signal and a non-delayed signal based on a control signal provided from the bypass control circuitry 64, as indicated in FIG. 3. The bypass control circuitry 64 may control the bypass circuitry 54 in the processing elements on the basis of an estimated power consumption associated with a future series of processing operations. The future series of operations may be predicted using prediction circuitry 66 based on a currently observed series of operations (for example, operations associated with instructions observed at the decode circuitry or the fetch circuitry). For example, a prediction table accessible by the prediction circuitry 66 may store a mapping between a currently observed series of operations and a future series of operations, and may be updated based on previously observed consecutive series of operations. A series of operations may comprise operations of one type, or operations of more than one type that can be considered together as a series of operations. Sequences of operations comprising the same type of operation could also be considered to be different series of operations if they are associated with a different execution bandwidth (since execution bandwidth may be associated with power consumption), so the prediction circuitry may also take as an input the execution bandwidth associated with a series of operations. As instructions may be executed out-of-order, certain operations of one type may be observed amongst operations belonging to a different series of operations. However, this may not necessarily mean the observed series of operations needs to be updated since there may be very few such instructions and it could be inaccurate to change the indication of the currently observed series of operations based on a single instance of an instruction not in the series. To monitor the current observed series of operations, one or more counters 68 may be provided. The one or more counters may be incremented when an operation not belonging to the current series of operations is observed, and may be decremented when an operation that does belong to the current series of operations is observed (the amount by which the counters are incremented and decremented may vary and may not be the same as each other). When the counter reaches a threshold value (which may be configurable), the prediction circuitry may update the indication of the currently observed series of operations. Each counter may correspond to a different series of operations, only being incremented in response to observing operations of the corresponding series, such that the updated series of operations is the series of operations corresponding to the counter reaching the threshold. Alternatively, a single counter could be provided and when the threshold is reached, further logic could determine which series of operations to select as the updated series of operations. Hence, individual operations not belonging to the current series of operations can be treated as noise, without causing the observed series of operations to change until sufficient numbers of the operations are observed.

Figure 8:
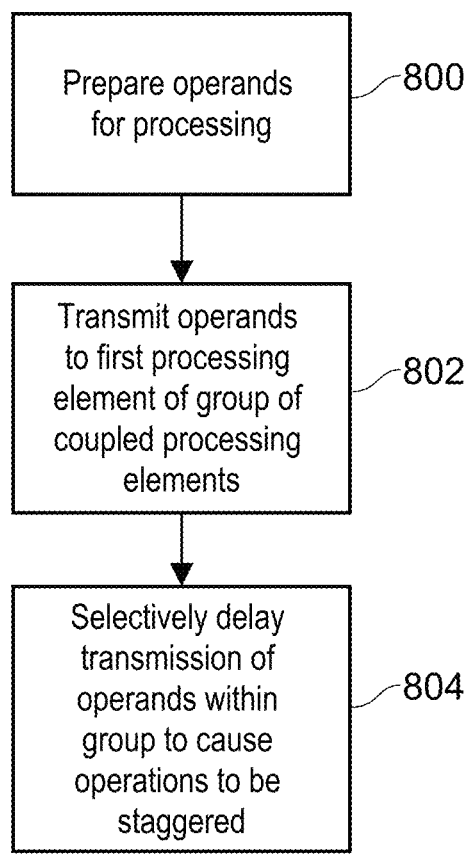
FIG. 8 is a flow diagram illustrating a process performed by a data processing apparatus.

FIG. 8 illustrates a process, performed by the data processing apparatus, for processing with a group of processing elements with reduced voltage noise. At step 800, the operand routing circuitry 60 prepares operands for data processing. This may be in response to instructions issued by the issue circuitry 12. Preparing the operands may involve retrieving operands from registers or memory and determining particular processing elements 40 to which the operands should be routed. At step 802, the operands are transmitted from the operand routing circuitry 60 to the receiving circuitry 42 of a first processing element 40 in one or more groups 62 of coupled processing elements. At this point, the selection circuitry 46 in the first processing element of each group may select operands from the received operands and optionally perform data processing operations on the selected operands with processing circuitry 48, and the result may be stored in storage circuitry 50. At least a subset of the received operands may also be transmitted via transmitting circuitry 44 to further processing elements in the group of coupled processing elements. At step 804, timing circuitry such as delaying circuitry 52, bypass circuitry 54, and bypass control circuitry 64, selectively delays the transmission of operands within the group of processing elements 40. This causes operations based on the operands to be delayed with respect to operations performed in processing elements closer (in the logical order by which operands are passed) to the operand routing circuitry. Hence, the timing circuitry causes operations to be staggered, which can reduce the size of sudden power changes, leading to reduced voltage noise.

Figure 9:
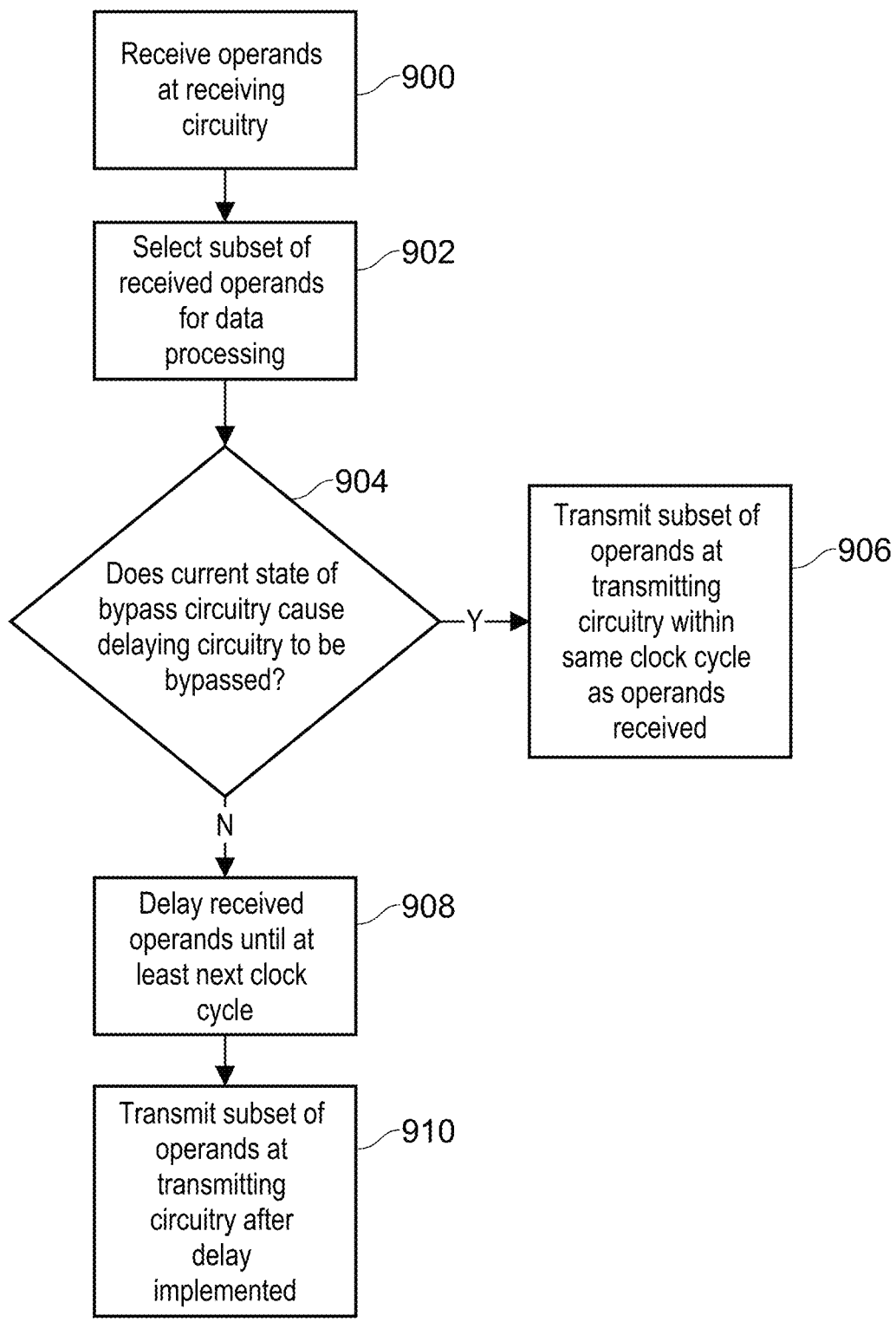
FIG. 9 is a flow diagram illustrating a process performed by a processing element.

FIG. 9 illustrates a process which may be performed at each processing element 40 to selectively delay the transmission of operands within a data processing system. At step 900, the processing element 40 receives a set of operands at the receiving circuitry 42. This may be within one clock cycle. At step 902, the operand selection circuitry 46 selects at least a subset of operands from the received operands and performs data processing on the selected operands using data processing circuitry 48 and storage circuitry 50. At step 904 it is determined whether or not the bypass control circuitry has controlled the bypass circuitry to bypass the delaying circuitry. This determination could be based on the state of a control signal provided to the bypass circuitry. If the control signal indicates that the bypass circuitry is to be bypassed, then at step 906 a subset of the received operands are transmitted by the transmitting circuitry 44 to a further processing element in the group 62 without incurring the delay of the delaying circuitry 52. For example, the received operands may be transmitted in the same clock cycle that they were received at the processing element 40. If the control signal indicates that the bypass circuitry is not to be bypassed, then at step 908 the delaying circuitry 52 imposes a delay before the subset of operands is transmitted. In some examples, the delay may be until the next clock cycle. Following the delay, at step 910 the subset of operands is transmitted to the further processing element 40.

Figure 10:
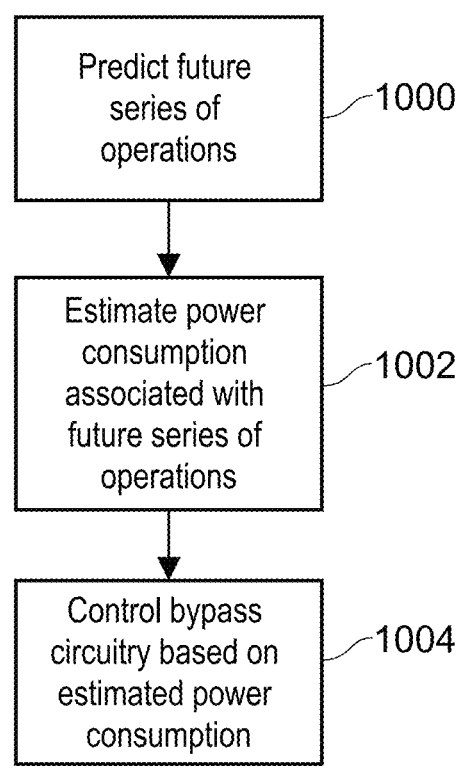
FIG. 10 is a flow diagram illustrating a process performed by bypass control circuitry.

FIG. 10 illustrates a process performed by the bypass control circuitry 64 for selectively bypassing delaying circuitry in a processing element whilst performing processing operations. At step 1000, a future series of operations is predicted. This may be performed based on a current series of operations, which may be determined based on operations observed at the decode circuitry or at another point in the processing pipeline, and updated as described with reference to FIG. 11. The current series of operations may be used to predict a future series of operations by performing a lookup in a table having entries associating a series of operations with a following series of operations. If no entry exists in the table, a standard process may be performed such as always causing the bypass circuitry to avoid bypassing the delaying circuitry. However, when a future series of operations is predicted, at step 1002 the bypass control circuitry may estimate a power consumption associated with the future series of operations. This may also be indicated in the prediction table. Based on the estimated power consumption, at step 1004 the bypass control circuitry may control the bypass circuitry in one or more processing elements 40 to control whether the delaying circuitry in the processing element 40 is bypassed. Delaying circuitry may be bypassed when the estimated power consumption is lower. In some cases, either all delaying circuitry is bypassed (when the estimated power consumption is below a threshold) or no delaying circuitry is bypassed (when the estimated power consumption is above the threshold). However, in other examples the delaying circuitry in a selection, but not all, of the processing elements may be bypassed. This may be the case for processing operations having an intermediate power consumption, for example, where to minimise voltage noise below an upper limit it is sufficient to prevent all operations from being started simultaneously, but not necessary for each operation in a group of processing elements to start at different clock cycles.

Figure 11:
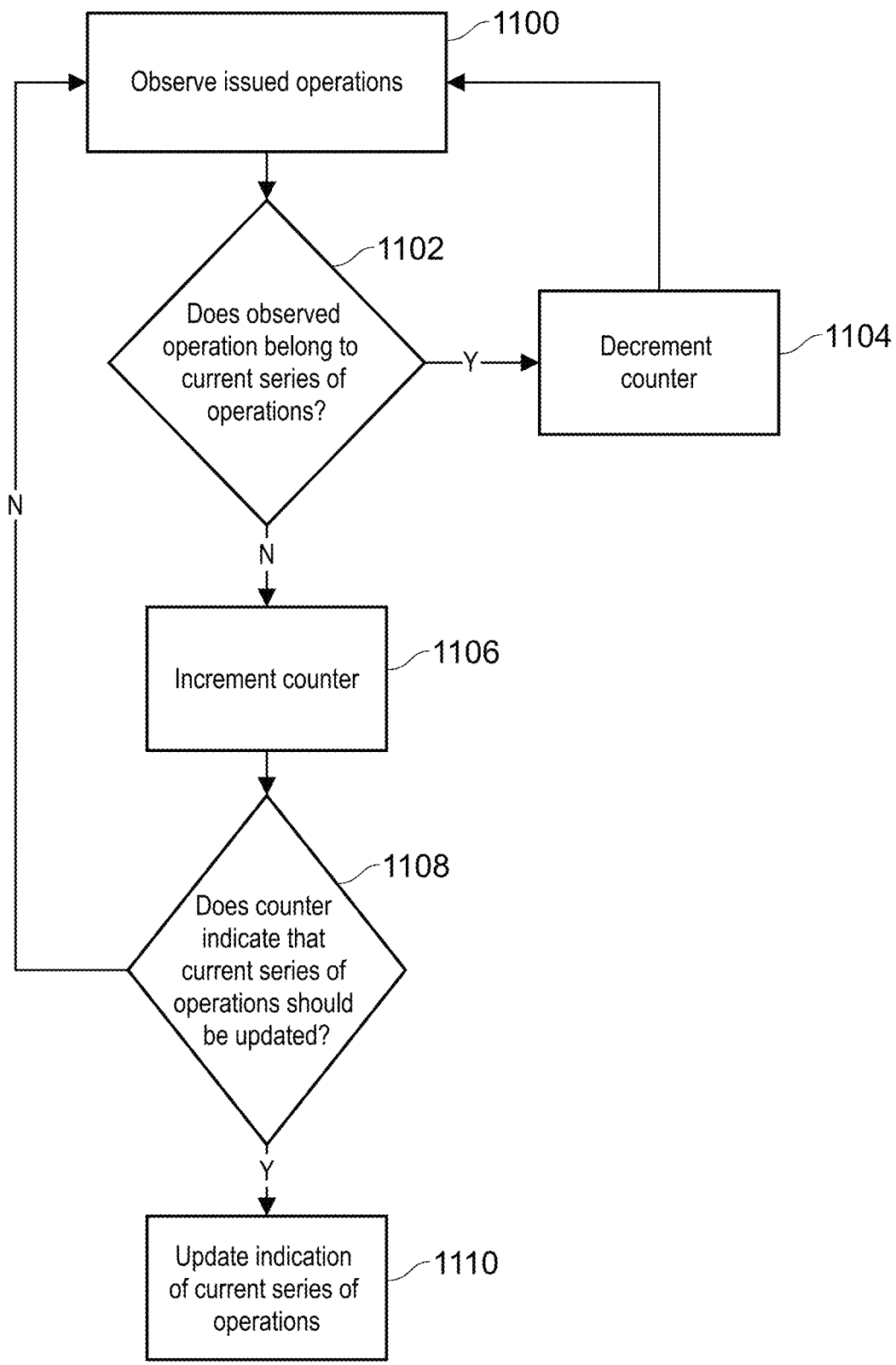
FIG. 11 is a flow diagram illustrating a process for determining a current series of operations.

FIG. 11 illustrates a process performed by a data processing apparatus for determining a current series of operations based on observed processing operations, where an indication of a current series of operations may be used for predicting a future series of operations and therefore for controlling whether or not delaying circuitry in a processing element causes the transmission of operands to be delayed. The process shown in FIG. 11 may be performed by the prediction circuitry or the bypass control circuitry (which in some examples may be the same circuitry). A series of operations is indicated as the current series of operations. At step 1100, operations are observed. For example, the issue circuitry 12 may be monitored to determine which operations are issued. Alternatively, earlier circuitry in the pipeline such as the decode circuitry could be monitored to observe decoded instructions. At step 1102 it is determined whether an observed instruction belongs to the series of operations that is indicated as the current series of operations. This determination may be made based on several different inputs. First, the current series of operations may only include operations of a particular type (e.g. multiply operations) and it can be determined that an operation of a different type does not belong to the current series of operations. The current series of operations may include operations of several types, and it could be determined that the observed operation is none of those types. Execution bandwidth can also be observed. If the operations are to be performed using a restricted set of resources, then these may be considered distinct from operations of the same type to be performed with a larger set of resources (since these operations may be associated with a different power consumption, and each series of operations is associated with an estimated power consumption). If at step 1102 it is determined that the observed operation belongs to a different series of operations, then at step 1106 the indication of the current series of operations may not be updated immediately. This can be to avoid prematurely updating the series of operations when certain operations are issued out of order. In other words, based on observing only a single operation that does not belong to the current series of operations, the level of confidence that a new series of operations has begun is low. Instead, a counter may be incremented to track the number of operations observed which do not belong to the current series of operations. As the value of the counter increases, the level of confidence that the series of operations has changed also increases. At a certain threshold level, confidence may be high enough to determine that the series of operations has changed. If the observed operation does belong to the current series of operations then at step 1104 the counter may be decremented, reducing the measure of confidence that the current series of operations has changed. At step 1108 it is determined whether the counter (or any of a set of counters, if the counters correspond to different series of operations) has reached the threshold indicating that the current series of operations should be updated. If not, the process returns to step 1100 as more operations need to be observed before it can be determined that the current series of operations has indeed changed. If, based on the counter reaching the threshold, it is determined that the current series of operations should be updated, then at step 1110 the indication of the current series of operations is updated. For example, a value stored in a register may be updated, or a flag may be set to indicate a current series of operations. The updated series of operations may be determined based on which counter reached the threshold (for example, if each counter tracks the confidence that the current series of operations has changed to a particular series of operations), or the updated series of operations may be determined in another way using further logic.

Figure 12:
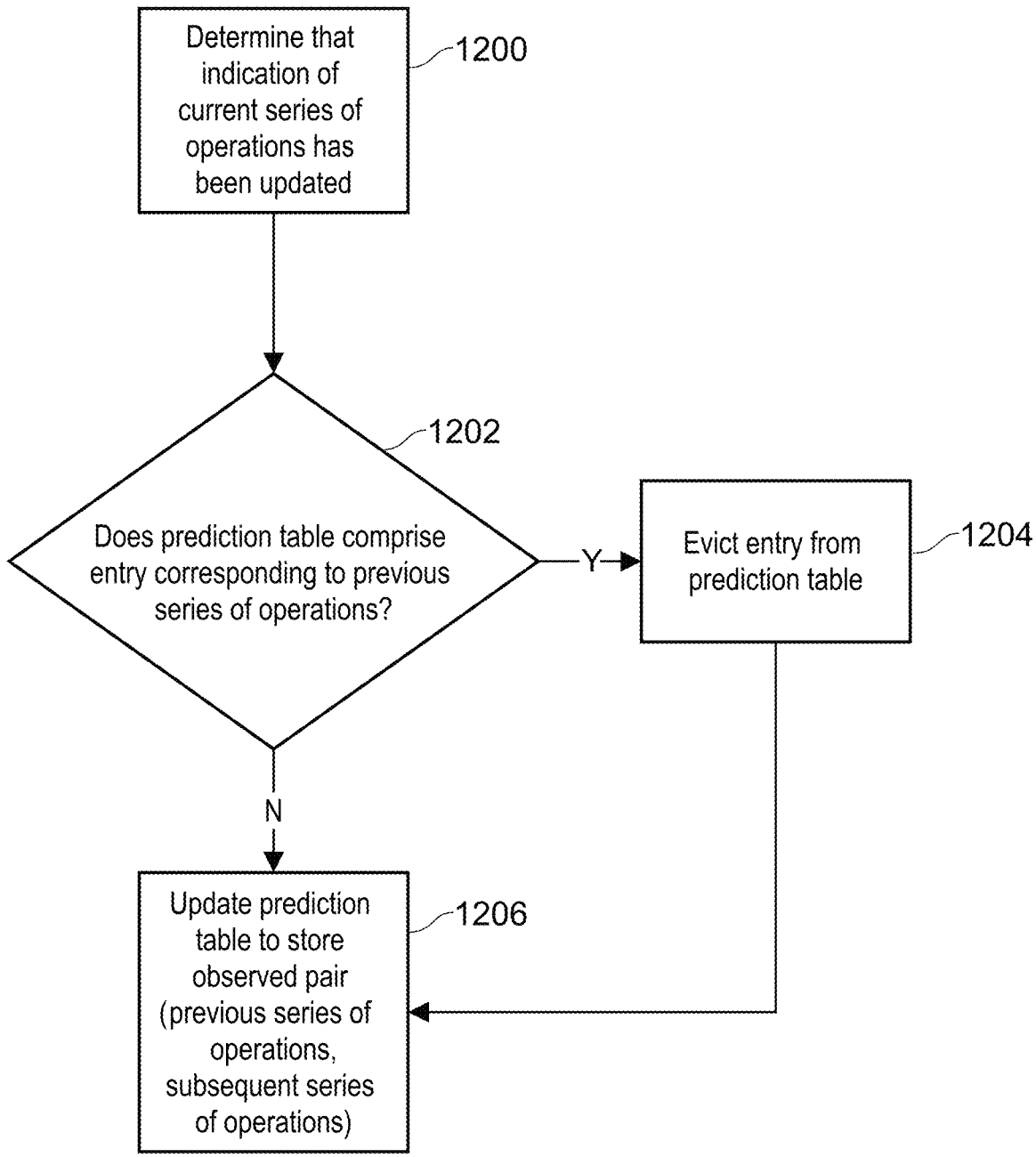
FIG. 12 is a flow diagram illustrating a process for updating a prediction table.

FIG. 13 illustrates an example of a sequence of observed operations, and illustrates how the observed operations are used to control a confidence counter which can be used to change an indication of a current series of operations. The indication of the current series of operations may be used as illustrated in FIG. 12 for predicting a future series of operations, with the future series of operations being used to select which control signals may be sent to bypassing circuitry in the processing elements for controlling whether the delaying circuitry is to be bypassed. The first column shown in FIG. 13 shows the operations that are observed (for example, at the instruction decoder). The second column shows the indicated current series of operations at the time that operation is observed, and the third column shows the value that the confidence counter should be set to following observation of the observed operation. At the start of the sequence of instructions illustrated in FIG. 13, the indicated current series of operations is "multiply" (as shown in the second column) and the confidence counter is zero. The first instruction illustrated is a multiply instruction which is observed whilst the current series of operations is "multiply". Therefore, it may be determined that the observed operation corresponds to the indicated current series of operations and the counter may be decremented (as illustrated in FIG. 13 however, if the counter is at a minimum value then it may not be decremented). The third instruction illustrated in FIG. 13 is a store instruction, not belonging to the multiply series of operations. In response to observing the instruction not belonging to the current series of operations, the confidence counter is incremented, indicating a higher level of confidence that a new series of operations has started. However, the incremented value may still be below a threshold confidence level, and therefore the indication of the current series of operations may not be updated yet. When the confidence counter does reach a threshold value (2 in the example of FIG. 13) then the level of confidence that a new series of operations has started may be high enough, and the indication of the current series of operations may be updated. In some examples, the new series of operations is set based on the operation type that caused the confidence counter to be incremented to the threshold value. In other examples, more than one counter may be provided. For example, a different counter may be provided corresponding to each different series of operations, each counter being incremented only in response to observing an operation corresponding to that counter. Therefore, each counter may represent the level of confidence that the series of operations has changed to a particular series of operations. In this example, the updated current series of operations may be the series of operations corresponding to the counter that reached the threshold. When the indication of the current series of operations is updated, this may be communicated to the prediction circuitry for predicting a future series of operations, which can then be used to control the bypass circuitry.

FIG. 12 illustrates a process for updating a prediction table in response to observed operations, so that the prediction table can be used to accurately predict future series of operations based on observed operations. At step 1200, it is determined that the indication of the current series of operations has been updated (e.g., step 1110 of FIG. 11 has occurred). At step 1202, it is determined whether the prediction table comprises an entry for which the "current series of operations" field corresponds to the previous series of operations that has been updated at step 1110. If so, then at step 1204 that entry is evicted from the prediction table since it may not be possible for two entries to have the same "current series of operations" field and different "future series of operations" fields, since it may then not be known which entry to use to predict a future series of operations. At step 1206, the table is updated to store the observed pair of series of operations: the previous series of operations updated at step 1110 and the future series of operations with which the previous series of operations was updated. Of course, if the future series of operations is the same as previously indicated in the hit entry then the eviction of step 1204 may be avoided. If at step 1206 the prediction table is full, then the oldest non-hit entry may be evicted to make space for the new entry. In this way, the table is updated based on workloads that are being executed by the apparatus to more accurately predict future series of operations, so that bypass control circuitry can accurately send control signals to cause the delaying circuitry to be bypassed when a predicted future series of operations is associated with low power consumption.

FIG. 14 illustrates an example of a prediction table which may be used to predict a future series of operations, enabling predictions to be made about future power consumption to be used to control bypass circuitry in processing elements. The table comprises a column corresponding to a previous series of operations and a column corresponding to a series of operations which is expected to follow the previous series of operations. For example, as indicated in the first entry of the table, the load series of operations is expected to be followed by the multiply series of operations, so when the load series is observed it may be predicted that the multiply series of operations will follow. Decisions regarding bypassing the delaying circuitry can then be made based on predicted future operations. For example, if the future series of operations is associated with a high power use (which may be indicated in a separate column of the prediction table, or may be determined separately based on the predicted future series of operations) then the bypass control circuitry may signal to the bypass circuitry that the delaying circuitry should not be bypassed for the future series of operations (for example, by controlling a multiplexer to select the input associated with the delaying element).

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

Additionally, examples of the present technique may be configured according to the clauses below.

(1) A data processing apparatus, comprising:
operand routing circuitry configured to prepare operands for processing;
a plurality of processing elements, each processing element comprising receiving circuitry configured to receive operands, processing circuitry configured to perform processing operations based on the received operands, and transmitting circuitry configured to transmit a subset of the received operands to a further processing element, wherein a group of coupled processing elements comprises a first processing element configured to receive operands from the operand routing circuitry and one or more further processing elements for which the receiving circuitry is coupled to the transmitting circuitry of another processing element in the group, such that the group of coupled processing elements is arranged to perform processing operations which take as inputs one or more input operands wherein each of the input operands is initially received from the operand routing circuitry at the first processing element; and
timing circuitry, configured to selectively delay transmission of operands within the group of coupled processing elements to cause operations performed by the group of coupled processing elements to be staggered.

(2) The data processing apparatus according to clause 1, wherein processing elements comprise storage circuitry for storing the result of operations performed by the processing circuitry.

(3) The data processing element according to clause 2, wherein the storage circuitry in each processing element comprises an architectural register.

(4) The apparatus according to any preceding clause, wherein one or more processing elements comprise delaying circuitry, wherein:
the delaying circuitry is part of the timing circuitry; and
for a processing element comprising delaying circuitry, the delaying circuitry is configured to introduce a delay between receiving operands at the receiving circuitry and transmitting the subset of the received operands with the transmitting circuitry, wherein the delay causes operations based on the transmitted operands to be delayed with respect to an operation at the processing element which takes the received operands as input operands.

(5) The apparatus according to clause 4, wherein
the delaying circuitry is controlled in dependence on a clock signal such that the delay applied by the delaying circuitry is based on the clock signal.

(6) The apparatus according to any of clauses 4 and 5, wherein
processing elements comprising delaying circuitry comprise bypass circuitry which is controllable to cause the transmission of received operands to bypass the delaying circuitry.

(7) The apparatus according to clause 6, comprising
bypass control circuitry configured to control bypass circuitry in the one or more processing elements comprising delaying circuitry, wherein
the bypass control circuitry is configured to control the bypass circuitry in dependence on an estimated power consumption associated with operations to be performed by the plurality of processing elements.

(8) The apparatus according to clause 7, wherein
the bypass control circuitry comprises prediction circuitry configured to predict a future series of operations based on an observed series of operations; and
the bypass control circuitry controls the bypass circuitry in dependence on an estimated power consumption associated with the future series of operations.

(9) The apparatus according to clause 8, wherein
the prediction circuitry comprises a prediction table in which one or more observed series of operations are associated with a corresponding future series of operations; and
the prediction table is updated using observed pairs of consecutive series of operations.

(10) The apparatus according to any of clauses 8 and 9, wherein
the prediction circuitry comprises counter circuitry, wherein:
the prediction circuitry is configured to identify a current observed series of operations based on observed individual operations,
the counter circuitry is updated based on a type of observed individual operations, and
the prediction circuitry is configured to update an identification of the current observed series of operations in response to the counter circuitry reaching a threshold value.

(11) The apparatus according to any of clauses 8 to 10, wherein
in response to the prediction circuitry predicting that a future series of operations comprises operations other than read and write operations, the bypass control circuitry is configured to control bypass circuitry to avoid bypassing the delaying circuitry when the plurality of processing elements is performing the future series of operations.

(12) The apparatus according to any preceding clause, wherein input operands for a given operation performed by the coupled group of processing elements are input into the first processing element together.

(13) The apparatus according to clause 12, wherein
the coupled group of processing elements is configured to perform a vector operation; and
input operands for the given operation comprise two or more values corresponding to vector elements of a same vector.

(14) The apparatus according to any preceding clause, wherein
the plurality of processing elements comprise operand selection circuitry; wherein
operand selection circuitry for a given processing element is configured to perform a selection of a subset of operands from the operands received at the receiving circuitry of the given processing element, wherein the subset of operands are operands to be used in a processing operation performed by the processing circuitry of the given processing element.

(15) The apparatus according to any preceding clause, wherein
the plurality of processing elements form a logical array of processing elements configured to perform operations producing a matrix output, wherein each processing element corresponds to an element of the matrix output such that values of the elements of the matrix output are given by processing results calculated by the processing circuitry of the corresponding processing element;
wherein the group of coupled processing elements corresponds to a row or column of the logical array of processing elements.

(16) The apparatus according to clause 15, wherein
in response to the plurality of processing elements being controlled to perform an outer product operation between a first vector and a second vector, the operand routing circuitry is configured to provide a set of input operands to each of a plurality of groups of coupled processing elements, each set of input operands comprising one element from the first vector and each element of the second vector.

(17) The apparatus according to any preceding clause, wherein
in at least one mode of operation, at least two processing elements in the group of coupled processing elements are configured to perform overlapped execution of operations based on operands that have been received at the first processing element in different processing cycles due to the delayed transmission of operands within the group of coupled processing elements.

(18) A data processing method, comprising:
preparing, with operand routing circuitry, operands for processing;
transmitting operands to a first processing element of a group of coupled processing elements, each processing element comprising receiving circuitry configured to receive operands, processing circuitry configured to perform processing operations based on the received operands, and transmitting circuitry configured to transmit a subset of the received operands to a further processing element, wherein the group of coupled processing elements comprises the first processing element configured to receive operands from the operand routing circuitry and one or more further processing elements for which the receiving circuitry is coupled to the transmitting circuitry of another processing element in the group, such that the group of coupled processing elements is arranged to perform processing operations which take as inputs one or more input operands wherein each of the input operands is initially received from the operand routing circuitry at the first processing element; and
selectively delaying, with timing circuitry, transmission of operands within the group of coupled processing elements to cause operations performed by the group of coupled processing elements to be staggered.

(19) A non-transitory computer-readable medium to store computer-readable code for fabrication of a data processing apparatus, comprising:
operand routing circuitry configured to prepare operands for processing;
a plurality of processing elements, each processing element comprising receiving circuitry configured to receive operands, processing circuitry configured to perform processing operations based on the received operands, and transmitting circuitry configured to transmit a subset of the received operands to a further processing element, wherein a group of coupled processing elements comprises a first processing element configured to receive operands from the operand routing circuitry and one or more further processing elements for which the receiving circuitry is coupled to the transmitting circuitry of another processing element in the group, such that the group of coupled processing elements is arranged to perform processing operations which take as inputs one or more input operands wherein each of the input operands is initially received from the operand routing circuitry at the first processing element; and
timing circuitry, configured to selectively delay transmission of operands within the group of coupled processing elements to cause operations performed by the group of coupled processing elements to be staggered.

The invention claimed is:
1. A data processing apparatus, comprising:
operand routing hardware circuitry configured to prepare operands for processing;
a group of coupled processing elements, each processing element in the group of coupled processing elements comprising receiving hardware circuitry configured to receive operands, processing hardware circuitry configured to perform processing operations based on the received operands, and transmitting hardware circuitry configured to transmit a subset of the received operands to a further processing element,
wherein the group of coupled processing elements comprises a first processing element configured to receive operands from the operand routing hardware circuitry, and the group of coupled processing elements comprises one or more further processing elements, wherein receiving hardware circuitry for each of the one or more further processing elements is coupled to transmitting hardware circuitry of another processing element in the group of coupled processing elements, such that the group of coupled processing elements is arranged to perform processing operations which take as inputs one or more input operands wherein each of the one or more input operands is initially received from the operand routing hardware circuitry at the first processing element;
the group of coupled processing elements comprises timing hardware circuitry, configured to selectively delay transmission of operands within the group of coupled processing elements to cause operations performed by the group of coupled processing elements to be staggered; and
the group of coupled processing elements comprises operand selection hardware circuitry; wherein
operand selection hardware circuitry for a given processing element in the group of coupled processing elements is configured to perform a selection of a selected subset of the operands received at receiving hardware circuitry of the given processing element, wherein the selected subset of the operands are operands to be used in a processing operation performed by processing hardware circuitry of the given processing element.

2. The data processing apparatus according to claim 1, wherein a given processing element in the group of coupled processing elements comprises storage hardware circuitry for storing results of operations performed by the processing hardware circuitry of the given processing element.

3. The data processing apparatus according to claim 2, wherein the storage hardware circuitry comprises an architectural register.

4. The data processing apparatus according to claim 1, wherein timing hardware circuitry of
a given processing element in the group of coupled processing elements comprises delaying hardware circuitry configured to introduce a delay between receiving a given set of operands at the receiving hardware circuitry of the given processing element and transmitting a subset of the given set of operands with the transmitting hardware circuitry of the given processing element, wherein the delay causes operations based on the transmitted subset of the given set of operands to be delayed with respect to an operation at a given further processing element which takes the given set of operands as input operands.

5. The data processing apparatus according to claim 4, wherein
the delaying hardware circuitry is controlled in dependence on a clock signal such that a delay applied by the delaying hardware circuitry is based on the clock signal.

6. The data processing apparatus according to claim 4, wherein
the given processing element comprises bypass hardware circuitry which is controllable to cause the subset of the given set of operands to be transmitted bypassing the delaying hardware circuitry.

7. The data processing apparatus according to claim 6, comprising
bypass control hardware circuitry configured to control the bypass hardware circuitry, wherein
the bypass control hardware circuitry is configured to control the bypass hardware circuitry in dependence on an estimated power consumption associated with operations to be performed by the group of coupled processing elements.

8. The data processing apparatus according to claim 7, wherein
the bypass control hardware circuitry comprises prediction hardware circuitry configured to predict a future series of operations based on an observed series of operations; and
the bypass control hardware circuitry controls the bypass hardware circuitry in dependence on an estimated power consumption associated with the future series of operations.

9. The data processing apparatus according to claim 8, wherein
the prediction hardware circuitry comprises a prediction table in which one or more observed series of operations are associated with a corresponding future series of operations; and
the prediction table is updated using observed pairs of consecutive series of operations.

10. The data processing apparatus according to claim 8, wherein
the prediction hardware circuitry comprises counter hardware circuitry, wherein:
the prediction hardware circuitry is configured to identify a current observed series of operations based on observed individual operations,
the counter hardware circuitry is updated based on a type of observed individual operations, and
the prediction hardware circuitry is configured to update an identification of the current observed series of operations in response to the counter hardware circuitry reaching a threshold value.

11. The data processing apparatus according to claim 8, wherein
in response to the prediction hardware circuitry predicting that the future series of operations comprises operations other than read and write operations, the bypass control hardware circuitry is configured to control the bypass hardware circuitry to avoid bypassing the delaying hardware circuitry when the group of coupled processing elements is performing the future series of operations.

12. The data processing apparatus according to claim 1, wherein input operands for a given operation performed by the group of coupled processing elements are input into the first processing element together.

13. The data processing apparatus according to claim 12, wherein
the given operation comprises a vector operation; and
input operands for the vector operation comprise two or more values corresponding to vector elements of a same vector.

14. The data processing apparatus according to claim 1, wherein
the group of coupled processing elements are part of a plurality of processing elements forming a logical array of processing elements configured to perform operations producing a matrix output, wherein each of the plurality of processing elements corresponds to an element of the matrix output;
wherein the group of coupled processing elements corresponds to a row or column of the logical array of processing elements.

15. The data processing apparatus according to claim 14, wherein
in response to the plurality of processing elements being controlled to perform an outer product operation between a first vector and a second vector, the operand routing hardware circuitry is configured to provide a set of input operands to each of a plurality of groups of coupled processing elements, each set of input operands comprising one element from the first vector and each element of the second vector.

16. The data processing apparatus according to claim 1, wherein
in at least one mode of operation, at least two processing elements in the group of coupled processing elements are configured to perform overlapped execution of operations based on operands that have been received at the first processing element in different processing cycles.

17. A data processing method, comprising:
preparing, with operand routing circuitry, operands for processing;
transmitting operands to a first processing element of a group of coupled processing elements, each processing element in the group of coupled processing elements comprising receiving circuitry configured to receive operands, processing circuitry configured to perform processing operations based on the received operands, and transmitting circuitry configured to transmit a subset of the received operands to a further processing element,
wherein the group of coupled processing elements comprises the first processing element, and the group of coupled processing elements comprises one or more further processing elements, wherein receiving circuitry for each of the one or more further processing elements is coupled to the transmitting circuitry of another processing element in the group of coupled processing elements, such that the group of coupled processing elements is arranged to perform processing operations which take as inputs one or more input operands wherein each of the one or more input operands is initially received from the operand routing circuitry at the first processing element;

selectively delaying, with timing circuitry, transmission of operands within the group of coupled processing elements to cause operations performed by the group of coupled processing elements to be staggered; and selecting a selected subset of operands received at receiving hardware circuitry of a given processing element in the group of coupled processing elements, wherein the selected subset of the operands are operands to be used in a processing operation performed by processing hardware circuitry of the given processing element.

18. A non-transitory computer-readable medium to store computer-readable code for fabrication of a data processing apparatus, comprising:

operand routing circuitry configured to prepare operands for processing;

a group of coupled processing elements, each processing element in the group of coupled processing elements comprising receiving circuitry configured to receive operands, processing circuitry configured to perform processing operations based on the received operands, and transmitting circuitry configured to transmit a subset of the received operands to a further processing element, wherein the group of coupled processing elements comprises a first processing element configured to receive operands from the operand routing circuitry, and the group of coupled processing elements comprises one or more further processing elements, wherein receiving circuitry for each of the one or more further processing elements is coupled to transmitting circuitry of another processing element in the group of coupled processing elements, such that the group of coupled processing elements is arranged to perform processing operations which take as inputs one or more input operands wherein each of the one or more input operands is initially received from the operand routing circuitry at the first processing element;

the group of coupled processing elements comprises timing circuitry, configured to selectively delay transmission of operands within the group of coupled processing elements to cause operations performed by the group of coupled processing elements to be staggered; and the group of coupled processing elements comprises operand selection hardware circuitry; wherein operand selection hardware circuitry for a given processing element in the group of coupled processing elements is configured to perform a selection of a selected subset of the operands received at receiving hardware circuitry of the given processing element, wherein the selected subset of the operands are operands to be used in a processing operation performed by processing hardware circuitry of the given processing element.

* * * * *